United States Patent [19]

Kuba et al.

[11] Patent Number: 5,299,213
[45] Date of Patent: Mar. 29, 1994

[54] SOLID STATE LASER APPARATUS

[75] Inventors: Kazuki Kuba; Takashi Yamamoto; Shigenori Yagi, all of Hyogo, Japan

[73] Assignee: Mitsubishi Denki Kabushiki Kaisha, Tokyo, Japan

[21] Appl. No.: 26,100

[22] Filed: Mar. 4, 1993

Related U.S. Application Data

[63] Continuation of Ser. No. 829,553, Feb. 5, 1992, abandoned, which is a continuation of Ser. No. 594,796, Oct. 9, 1990, abandoned.

[30] Foreign Application Priority Data

Oct. 12, 1989 [JP] Japan .................. 1-265596
Oct. 24, 1989 [JP] Japan .................. 1-276408

[51] Int. Cl.$^5$ .......................................... H01S 3/045
[52] U.S. Cl. ............................. 372/35; 372/34; 372/70
[58] Field of Search .................. 372/34, 35, 36, 70, 372/72

[56] References Cited

U.S. PATENT DOCUMENTS

| 4,468,774 | 8/1984 | Robbins | 372/35 |
| 4,852,109 | 7/1989 | Kuchar | 372/34 |
| 4,993,041 | 2/1991 | Sidler et al. | 372/35 |

FOREIGN PATENT DOCUMENTS

352243A1 1/1987 Fed. Rep. of Germany .

OTHER PUBLICATIONS

"The Slab Geometry Laser", William B. Jones—*Laser Focus/Electro Optics*, Sep. 1983; pp. 107–114.
"Slab -Laser-Technologie—Ein Überlick", J. Eichner N. Hedgson, *Laser Magazine*, Apr. 1989; pp. 12–18.
English Translation of an Official Action of German Patent Office, Aug. 12, 1992.
Gelinas, Thermal-Stress-Optics Modeling, Oct. 29, 1985.
Kane et al, "Reduced Thermal Focusing . . . Lasers", IEEE Journal of Quantum Electronics, vol. QE-19, No. 9, Sep. 1983, pp. 1351 et seq.
Eggleston et al, "A High Average Power . . . Power System", IEEE Journal of Quantum Electronics, vol. QE-22, No. 11, Nov. 1986, pp. 2092 et seq.

*Primary Examiner*—James W. Davie
*Attorney, Agent, or Firm*—Sughrue, Mion, Zinn, Macpeak & Seas

[57] ABSTRACT

A solid state laser apparatus comprises a laser medium having a pair of optically flat surfaces confronting to each other, and side surfaces intersecting the optically flat surfaces along an optical axis, the laser medium having a rectangular cross section; heat insulators adhered to the side surfaces of the laser medium; and reflective films for shielding the thermal insulators from pumping light. A solid state laser apparatus may comprise heat conductors bonded to the side surfaces of the laser medium, the heat conductors removing heat which occurs at bonding surfaces, the amount of removed heat from the side surfaces being smaller than that from the optically flat surfaces.

6 Claims, 10 Drawing Sheets

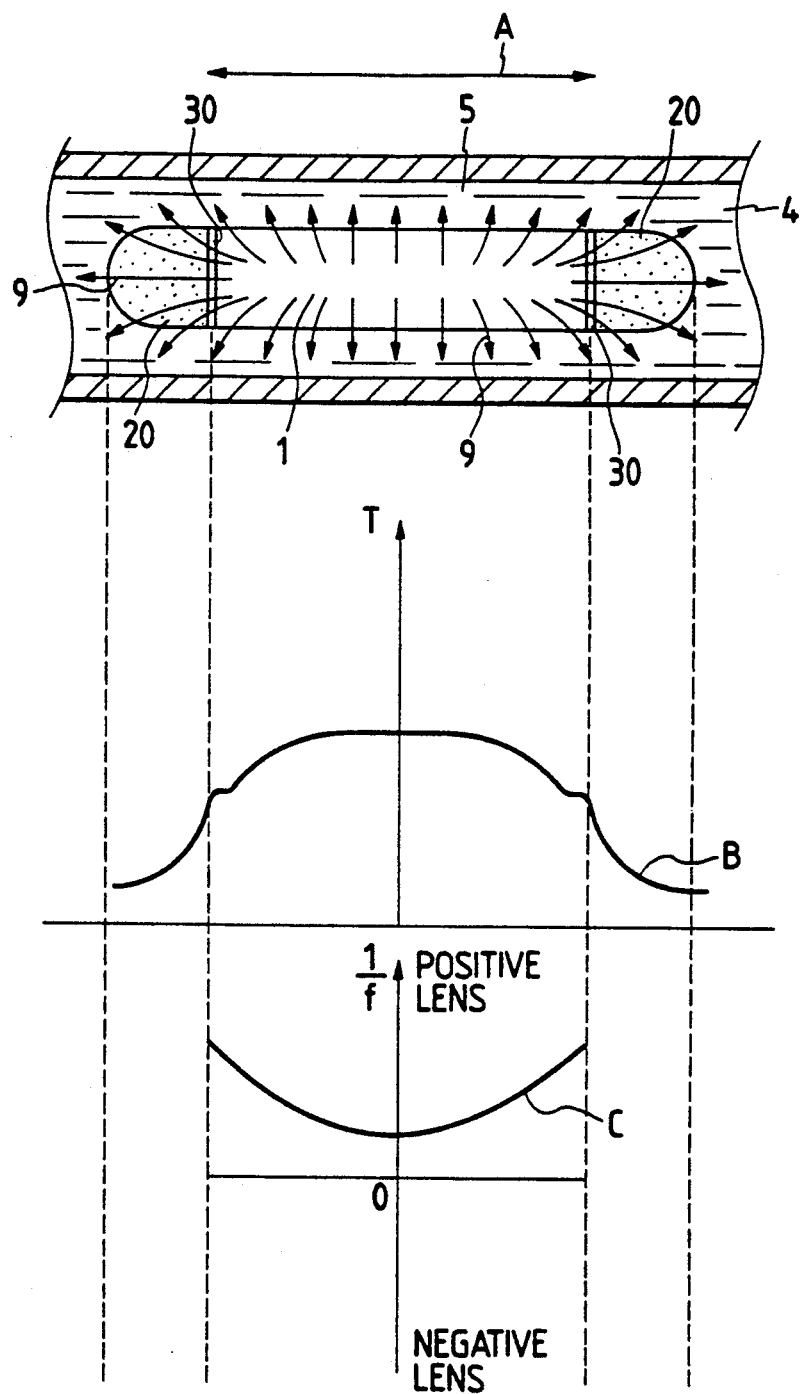

SOLID STATE LASER APPARATUS

This is a continuation of application Ser. No. 07/829,553, filed Feb. 5, 1992, now abandoned, which is a continuation of U.S. application Ser. No. 07/594,796, filed on Oct. 9, 1990, now abandoned.

BACKGROUND OF THE INVENTION

The present invention relates to a solid state laser apparatus having a slab geometry laser medium whose cross section is rectangular, particularly relates to reduction of thermal lensing in the laser medium.

FIG. 1 is a cross sectional view of the structure of a conventional slab geometry solid state laser apparatus which is disclosed in a magazine (Laser Focus/E-0 TECHNOLOGY, SEPTEMBER, 1983 P. 106). In the figure, numeral 1 designates a laser medium; 1a, optically flat surfaces of the laser medium 1; 1b, optically non-smooth surfaces which intersect the optical flat surfaces 1a along the optical axis; 2, thermal insulators bonded to each of the non-smooth surfaces 1b; 5, a flow path of a coolant 4 for cooling the laser medium 1; 6, a circulating direction of the coolant 4; 7, a pumping lamp; 8, a pair of reflecting mirrors; and 71, pumping light.

By referring to FIG. 1, the operation of the apparatus will be described in the following.

In FIG. 1, the pumping light 71 radiated from the pumping lamp 7 is reflected by the reflecting mirrors 8 and then absorbed by the laser medium 1. Part of the energy is extracted by a pair of resonance mirrors (not shown in the figure) to the outside of the laser medium as a laser beam. The absorbed energy which is not used for the laser oscillation is converted into a thermal energy in the laser medium 1. The thermal energy heats up the laser medium 1. The laser medium 1 is cooled by the coolant 4 which is circulated in the flow path 5 so as to keep it at a predetermined temperature.

FIG. 2 is a view showing a heat flow, a temperature distribution, and thermal lens distribution generated by a temperature distribtion of the aforementioned laser medium 1.

If the heat generation in the laser medium 1 is uniform, the cooling effect on the optically flat surfaces 1a is uniform, and the heat insulation of the non-smooth surfaces 1b is perfect, then the temperature distribution in the width direction of the laser medium becomes uniform and thereby a thermal lens does not take place.

Even if the heat generation and cooling of the laser medium are uniform, the perfect insulation of the heat flow from the non-smooth surfaces 1b is impossible. When the temperature of the thermal insulators 2 becomes very high, much heat flows from the thermal insulators 2 to the laser medium 1 and then a temperature distribution is formed in the width direction A of the laser medium 1.

Actually, the thermal insulators 2 absorb the pumping light 71 from the pumping lamp 7 and thereby the temperature of the thermal insulators 2 becomes very high as shown by curve B of FIG. 2. Although the members 2 bonded to the side surfaces 1b are the thermal insulators, much heat flows to the laser medium 1 as shown by arrow 9 of FIG. 2. Thus, a temperature distribution as shown by curve B of FIG. 2 is formed. In the figure, To represents a water temperature. Consequently, a thermal lens is formed as shown by curve C of FIG. 2. In the figure, f is a focal length. It is clearly understood that a negative lens is formed.

Further, as shown in FIG. 3, even if the laser medium 1 is uniformly irradiated with the pumping light, strong heat generation may occur in bonding layers 30 with which the thermal insulators 2 are bonded to the laser medium 1. Since the thermal conductivity of the laser medium 1 is large enough compared with that of the thermal insulator, the heat generated in the bonding layers 30 is removed by the laser medium as shown by arrow 9 of FIG. 3. Thus, as shown by curve B of FIG. 3, a temperature distribution takes place in the width direction A of the laser medium 1, and a thermal lens takes place as shown by curve C of FIG. 3.

As was described above, in the conventional slab geometry solid state laser apparatus, a temperature distribution takes place in the width direction of the laser medium 1. Thus, a thermal lens occurs. The thermal lens results in distorting a laser beam pattern and decreasing the wall plug efficiency of the laser oscillation.

SUMMARY OF THE INVENTION

An object of the present invention is to solve such problems and to provide a solid state laser apparatus having a high beam quality without a distortion of laser beam pattern and a decrease of wall plug efficiency of the laser oscillation.

The solid state laser apparatus according to the present invention is provided with a means for shielding the thermal inslators from pumping light.

Further, the solid state laser apparatus according to the present invention is provided with heat conductors disposed in contact with side surfaces of the laser medium and cooling means for cooling the laser medium and the heat conductors. The heat conductivity of the heat conductors is determined so that the heat conductors can remove the heat from the surfaces in contact with the laser medium and that the amount of removal heat from the side surfaces is smaller than that from the optically flat surfaces.

The cooling means may be provided with means for controlling the cooling performance of the heat conductors.

The means for preventing the thermal insulator on the side surfaces of the laser medium from absorbing a pumping light prevent the thermal insulator from absorbing the pumping light and generating heat. Consequently, the means decrease the temperature distribution which occurs in the width direction of the laser medium, thereby decreasing a thermal lens.

The heat conductors of the present invention remove heat generated in the vicinity of the side surfaces of laser medium so as to decrease the temperature distribution in the width direction of the laser medium and decrease a thermal lens. The means for controlling the cooling performance of the heat conductors controls the cooling performance of the heat conductors and optimally controls the removal of heat from the side surfaces of laser medium surface.

BRIEF DESCRIPTION OF DRAWINGS

FIGS. 10 and 11 are views describing a thermal lens of the laser medium according to the third embodiment of the present invention.

DETAILED DESCRIPTION OF THE PREFERRED EMBODIMENTS

By referring to the accompanying drawings, embodiments of the present invention will be described in the following.

Figure 4:
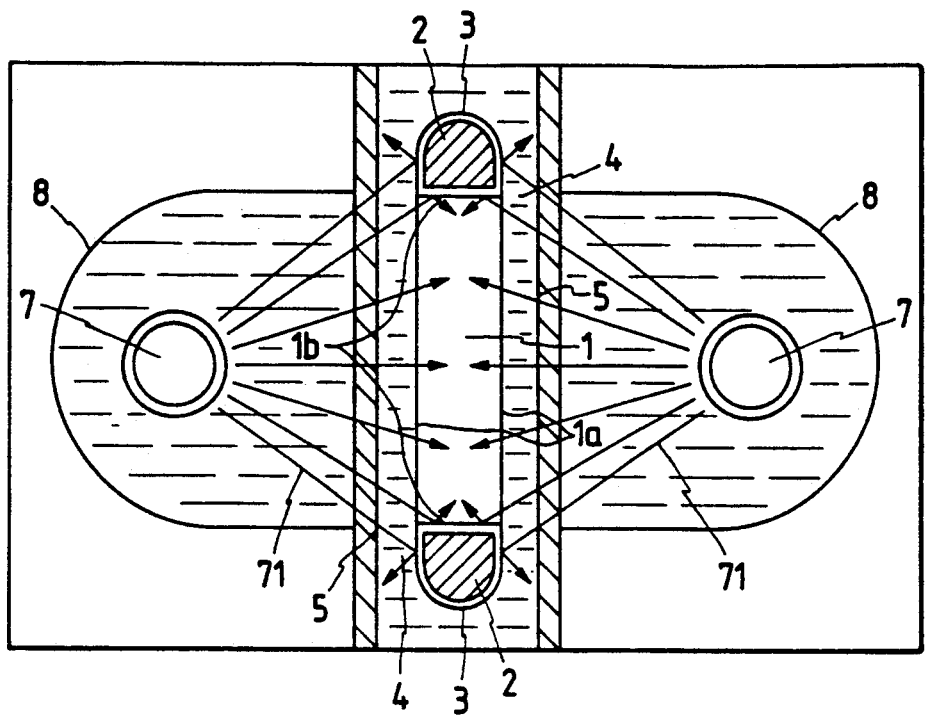
FIGS. 4 and 5 a cross sectional view and a partial sectional plan view showing a solid state laser apparatus according to a first embodiment of the present invention, respectively.
Figure 5:
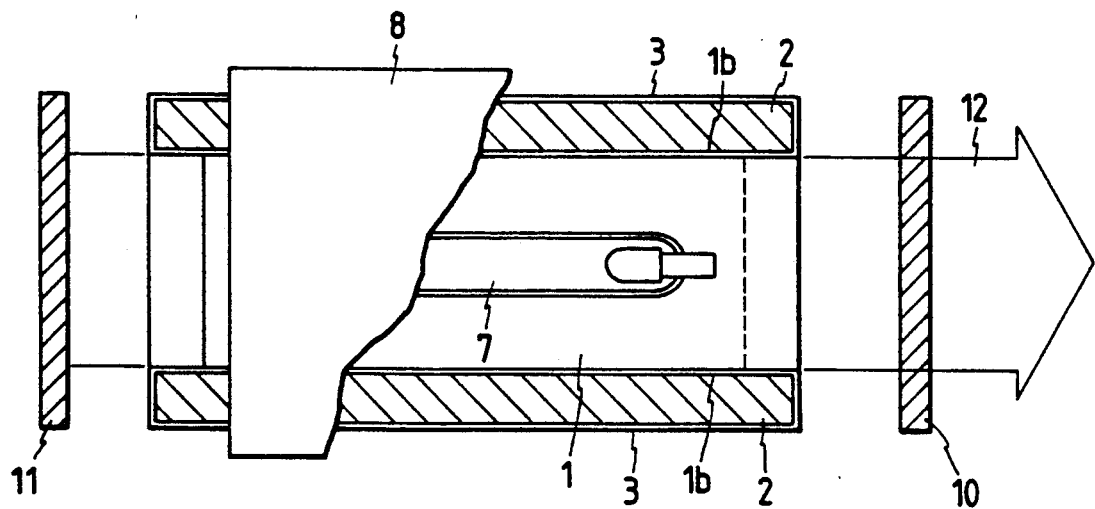

FIGS. 4 and 5 are a cross sectional view and a plan view showing a solid state laser apparatus of a first embodiment of the present invention. In the figures, numeral 3 denotes high reflection coating films applied on heat insulators 2 for a highly reflecting pumping light 71. Numerals 10 and 11 denote a pair of resonator mirrors. Numeral 12 denotes a laser beam.

Then, the operation of the solid state laser apparatus will be described. In FIGS. 4 and 5, the pumping light 71 radiated from a pumping lamp 7 is collected by reflecting mirrors 8 and then absorbed by a laser medium 1. Part of the energy of the pumping light is extracted to the outside of the laser medium as the laser beam 12 by the pair of resonator mirrors 10 and 11. In the laser medium, the absorbed energy which is not used for the laser oscillation is converted into thermal energy. The thermal energy heats up the laser medium 1. The laser medium 1 is cooled by a refrigerant 4 which is circulated in a flow path 5.

Figure 1:
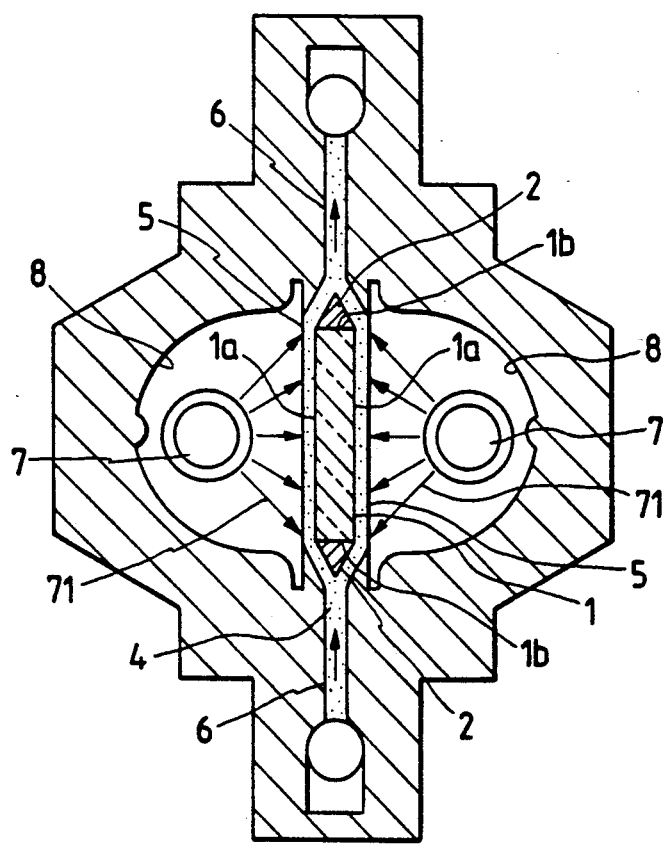
FIG. 1 is a cross sectional view of the structure of a conventional solid state laser apparatus.
Figure 2:
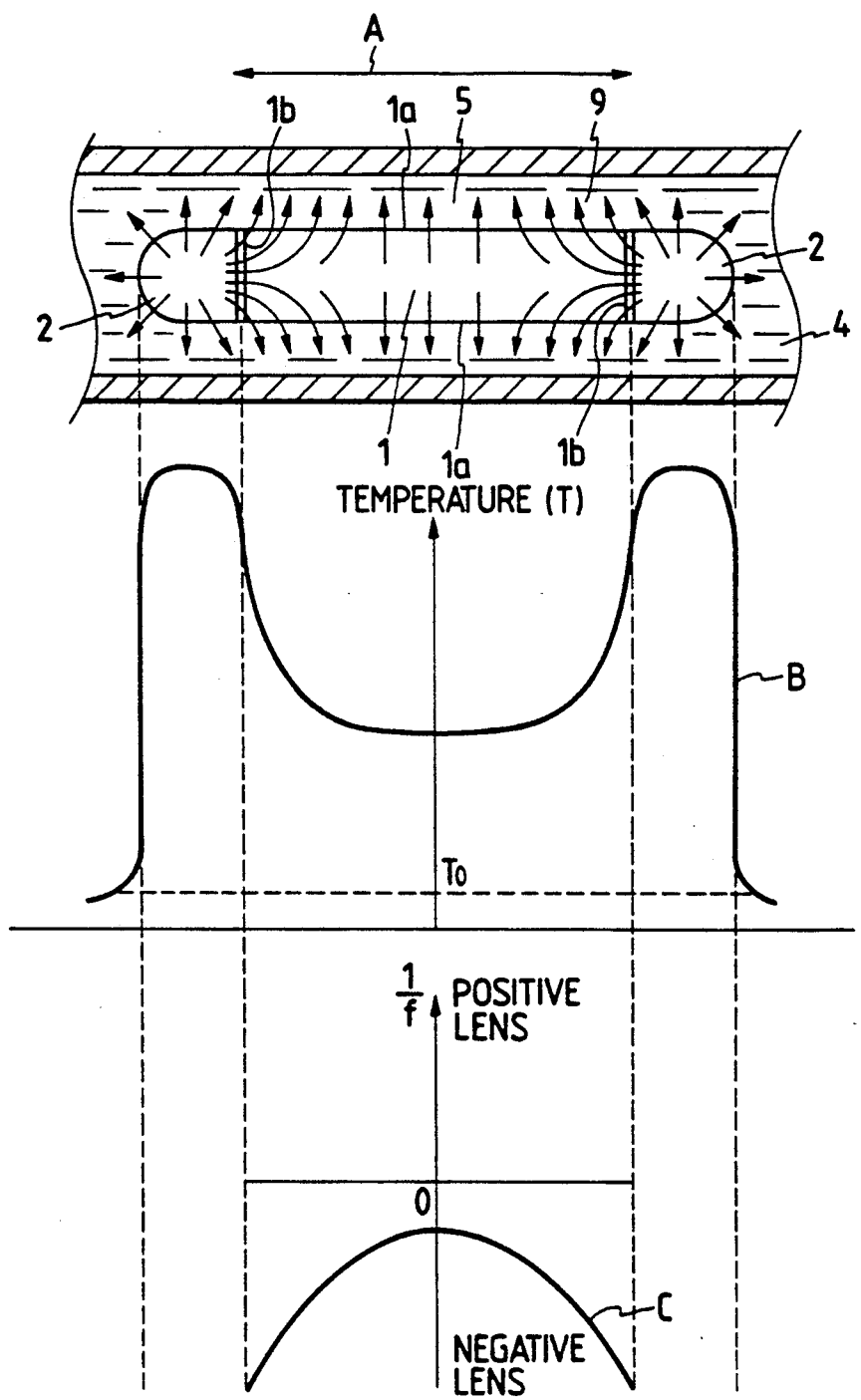
FIGS. 2 and 3 are views describing the mechanism why a conventional laser medium formed a thermal lens.

As was described above, in the conventional solid state laser apparatus, as shown in FIG. 2, since the pumping light 71 is absorbed by the thermal insulators 2 on the side surfaces of the laser medium, the thermal insulators 2 heat up and thereby a temperature distribution takes place in the width direction of the laser medium. Thus, the thermal lens occurs in the laser medium. Actually, when a GGG crystal (thermal conductivity: $K=0.09$ W/cm deg) whose cross sectional area is 7 mm $\times$ 35 mm is used as the laser medium 1; and acrylic resin (thermal conductivity: $K=0.0021$ W/cm deg) is used as the thermal insulator 2, the aforementioned thermal lens is observed. When the electrical input power is 9 kW, the focal length of the thermal lens is $-2$ m in the vicinity of the side surface of the laser medium and $-10$ m at the center of the laser medium.

In this invention, to decrease the thermal lens of the laser medium 1 caused by the heating of the thermal insulators 2, the high reflection coating films 3 which shields the thermal insulators 2 from the pumping light are applied on the thermal insulators 2 on the side surfaces of the laser medium.

Figure 6:
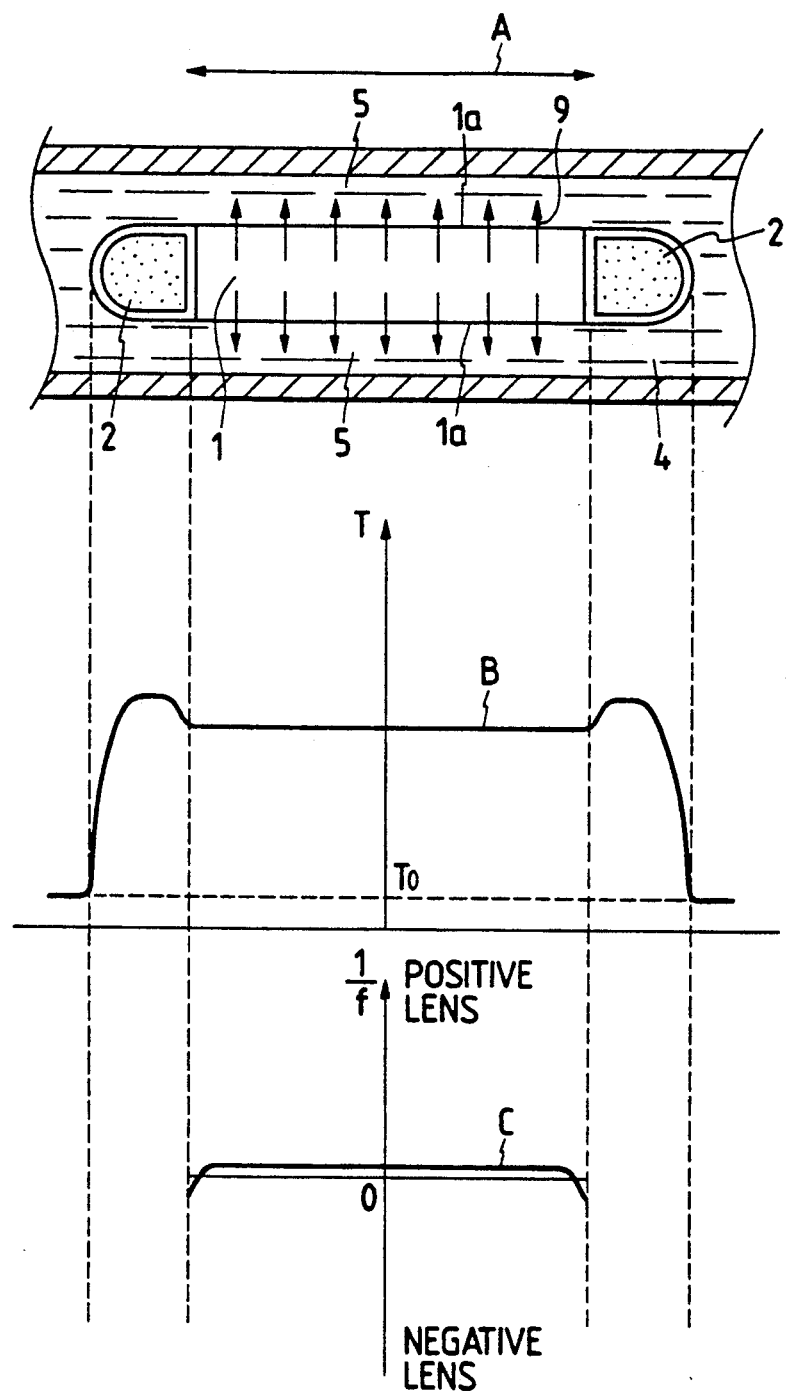
FIG. 6 is a view describing a thermal lens of a laser medium according to the first embodiment of the present invention.

As shown in FIG. 4, the pumping light 71 from the pumping lamp 7 is directly and indirectly reach to the thermal insulators 2. On the entire surfaces of the heat insulators 2, the coating films 3 are applied by, for example, aluminum vacuum-evaporation. Thus, the exciting light 71 whose wavelength ranges from 300 nm to 900 nm is almost reflected. Consequently, the thermal insulators 2 do not heat up and its temperature does not increase. Thus, the temperature of the thermal insulators 2 relatively becomes low. When the temperature difference between the thermal insulators 2 and the laser medium 1 is small, the heat does not flow between the thermal insulators 2 and the laser medium 1. The heat flow of the laser medium 1 takes place uniformly and perpendicularly to almost the entire surfaces of the laser medium 1a as shown by arrow 9 of FIG. 6. In addition, the temperature distribution of the laser medium 1 is uniform in the width direction A as shown by curve B of FIG. 6. Thus, as shown by curve C of FIG. 6, in the laser medium 1, the thermal lens does not occur in the width direction A. Thus, the distortion of the laser beam pattern and the wall plug efficiency of the laser oscillation can be remarkably improved.

As the high reflection coating films 3 on the thermal insulators 2, besides the above aluminum evaporated films, it is preferable to use silver evaporated films, silver electroplated films, and those to which antioxidant treatment is applied, each of which has a high reflectivity for a short wavelength region about 300 nm. On the other hand, when an arc lamp is used for the pumping lamp 7, the wavelength of most spectrum components is 500 nm or more. Thus, as the high reflection coating film, it is also preferable to use gold evaporated films, gold electro-plated films, and those to which antioxidant treatment is applied.

To prevent the parasitic oscillation whose optical path is reflected on the laser medium side surfaces 1b, the laser medium side surfaces 1b of the thermal insulators 2 is formed as the scattering surfaces, and is applied high reflection coating films so as to allow the laser medium side surfaces 1b to become the scattering and high reflecting surfaces.

Figure 7:
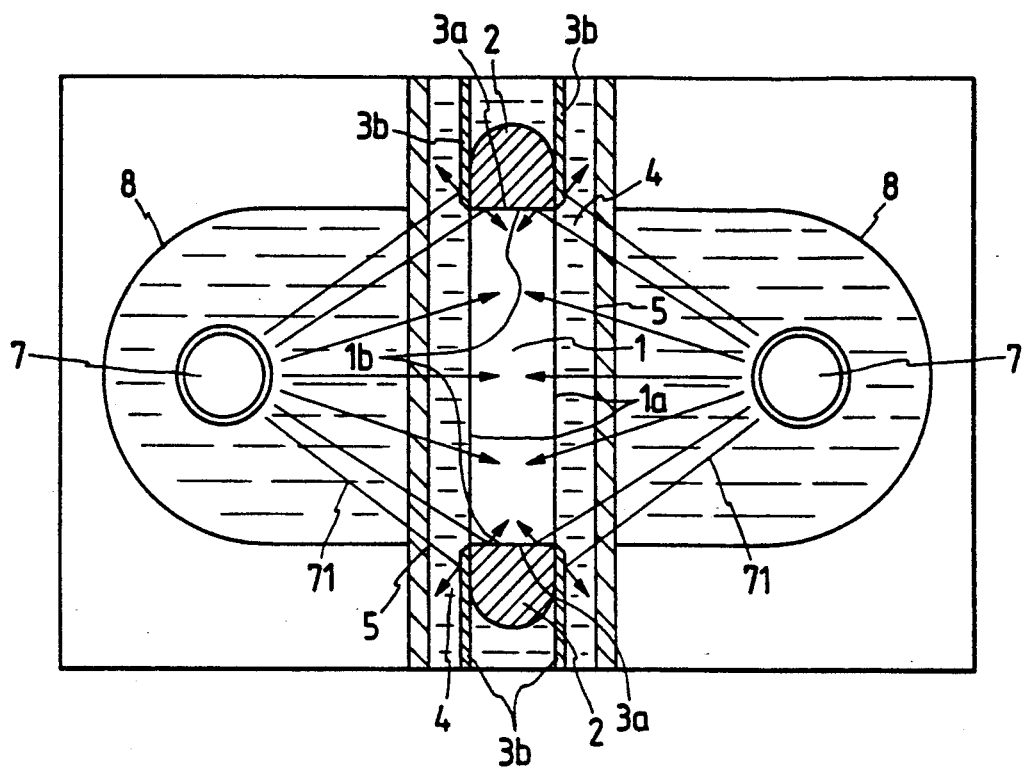
FIG. 7 is a cross sectional view showing the structure of a solid state laser apparatus according to a second embodiment of the present invention.

In the aforementioned embodiment, as the means for shielding the thermal insulators 2 from pumping light, the high reflection coating films 3 are applied on the heat insulators 2. However, as shown in FIG. 7, which is a second embodiment of the present invention, by applying the high reflection coating films 3a for highly reflecting the pumping light 71 to the laser medium side surfaces 1b and by disposing light shielding plates 3b on the upper and lower surfaces of the thermal insulators 2, the same effect as the first embodiment can be accomplished.

As described above, according to the present invention, the means for shielding the thermal insulator from pumping light is applied to the thermal insulator in contact with the side surfaces of the laser medium or bonded thereto is provided so as to prevent the heat insulators from absorbing the pumping light, heating up, and becoming a high temperature. Thus, it decreases the temperature distribution in the width direction of the laser medium and the thermal lensing. Consequently, a solid state laser apparatus with a high beam quality but free from the distortion of the laser beam pattern and decrease of wall-plug efficiency of laser oscillation can be provided.

Figure 8:
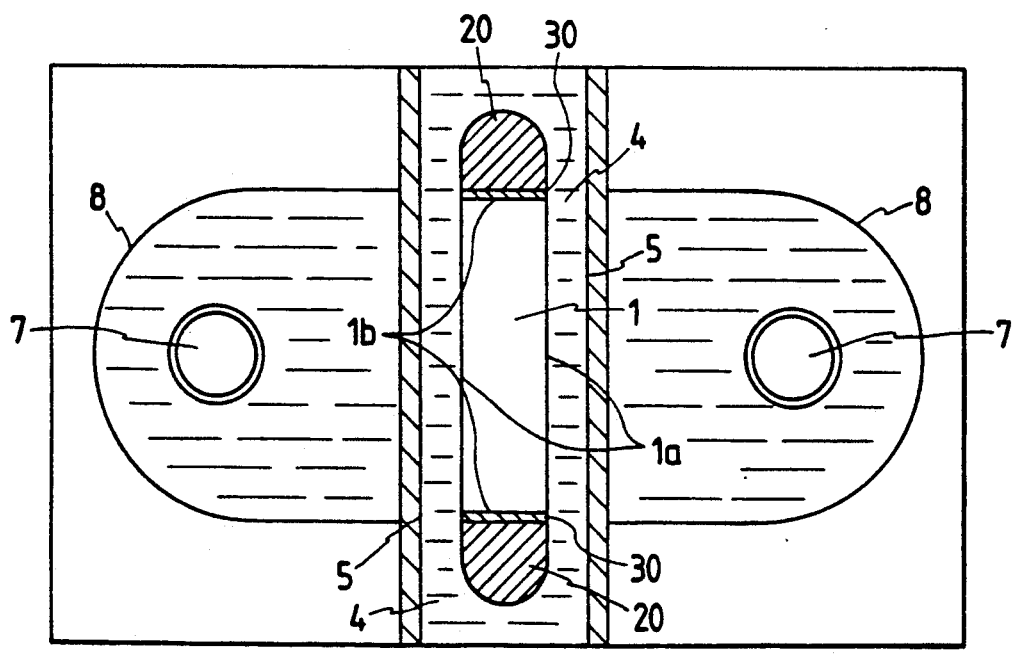
FIGS. 8 and 9 are a cross sectional view and a plan view showing a solid state laser apparatus according to a third embodiment of the present invention, respectively.
Figure 9:
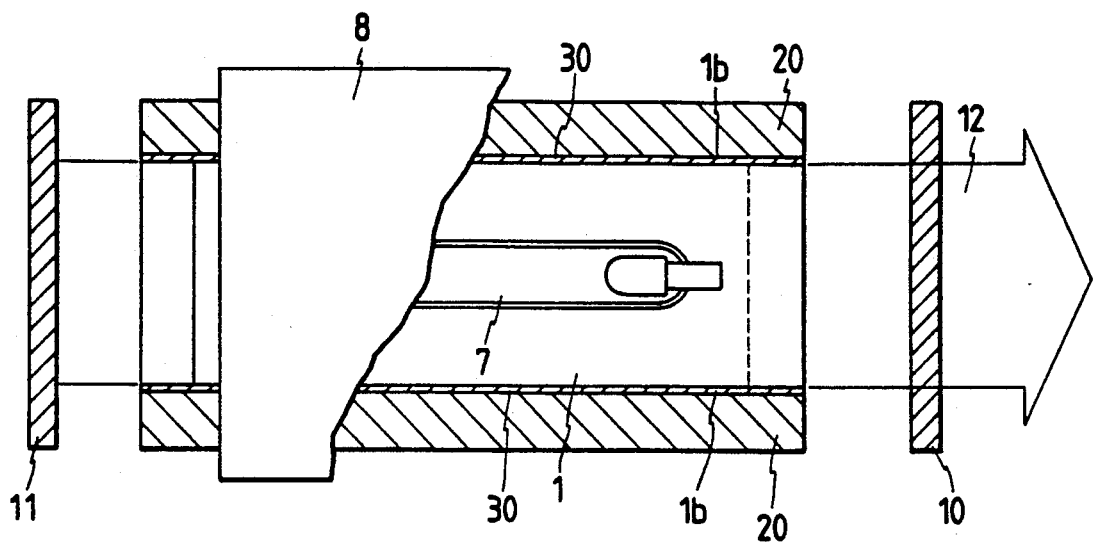

FIGS. 8 and 9 are a cross sectional view and a plan view showing a solid state laser apparatus of a third embodiment of the present invention.

In the figures, numeral 1 denotes a laser medium whose cross section is rectangular; 1a, optically flat surfaces of the laser medium; 1b, optically non-smooth surfaces of the laser medium; 20, heat conductors bonded to the non-smooth surfaces 1b; 30, bonding layers; 4, a refrigerant for cooling the laser medium 1 from the optically flat surfaces 1a and heat conductors 20; 5, a flow path of the refrigerant 4; 7 a pumping lamp for the laser medium 1; 8, reflecting mirrors for the pumping lamp 7; 10 and 11, a pair of resonator mirrors; and 12, a laser beam.

The operation of the solid state laser apparatus of the third embodiment will be described. In FIGS. 8 and 9, the pumping light radiated from the pumping lamp 7 is reflected by the reflecting mirrors 8 and then absorbed by the laser medium 1. Part of the energy is extracted to the outside of the laser medium as the laser beam 12 by the pair of resonator mirrors 10 and 11. In the laser medium, the energy which is not used for the laser oscillation is converted into a thermal energy. The thermal energy heats up the laser medium 1. The laser medium 1 is cooled by the refrigerant 4 which is circulated in the flow path 5.

Figure 3:
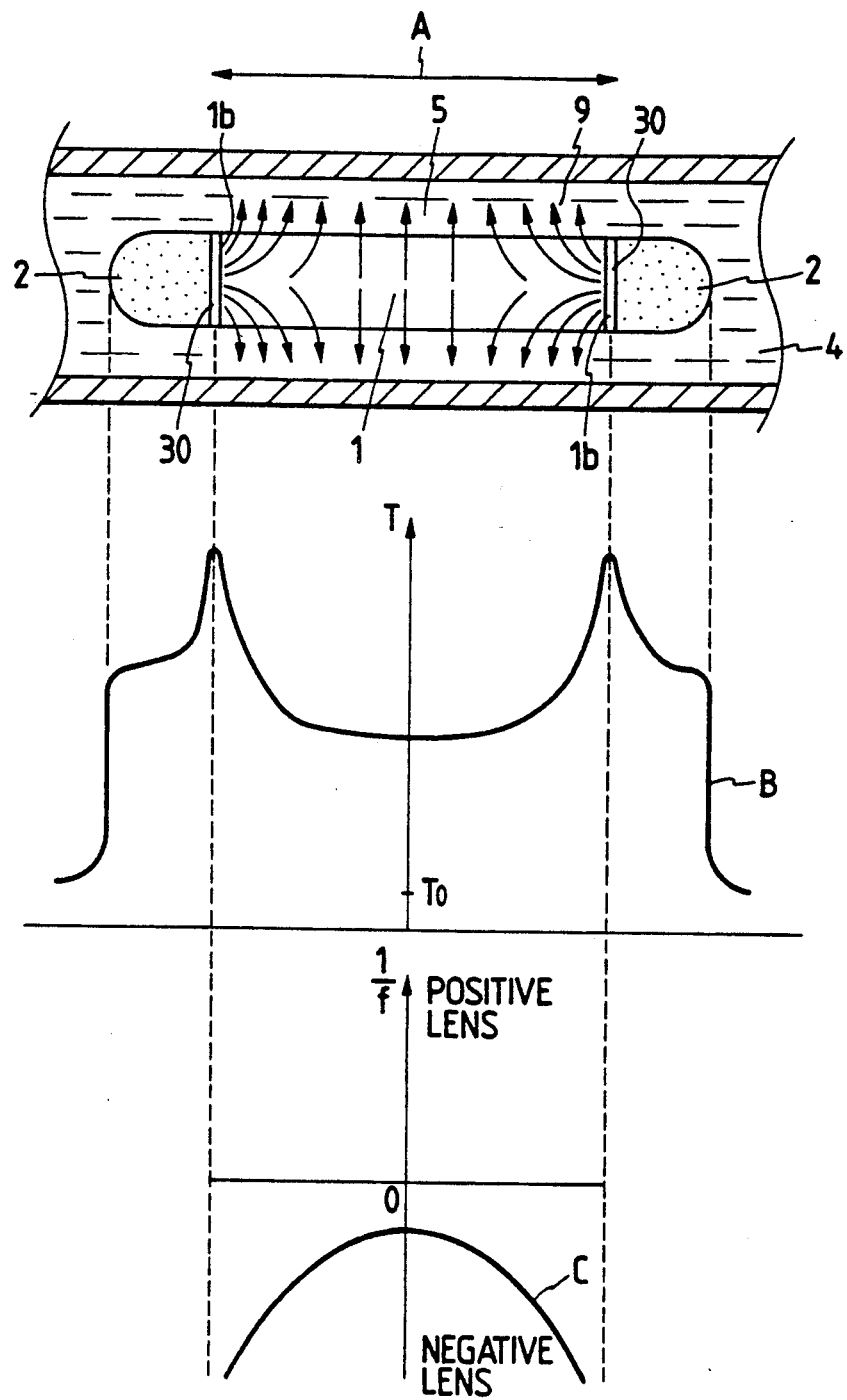

As was described above, in the conventional solid state laser apparatus, as shown in FIG. 3, the thermal insulators 2 are bonded on the non-smooth surfaces of the laser medium, strong heat generation in the bonding layers 30 should be removed from the side of the laser medium. The heat flow is shown by arrow 9 of FIG. 3. In the temperature distribution shown by curve B of FIG. 3, high temperature regions are present on the both sides of the laser medium. Thus, as shown by curve C of FIG. 3, a strong negative lens is formed on both sides of the laser medium, and a weak negative lens is formed at the center thereof.

This situation is actually observed when a GGG crystal (thermal conductivity: $K=0.09$ W/cm deg) whose cross sectional area is 7 mm $\times$ 35 mm is used as the laser medium 1; acrylic resin (thermal conductivity: $K=0.0021$ W/cm deg) is used as the thermal insulators 2; Silpot 186 (thermal conductivity: $K=0.0015$ W/cm deg), which is a transparent silicone type bonding agent, is used as an adhesive, and the thickness of the bonding layer is in the range from 50 to 100 $\mu$m. When the electrical input power is 9 kW, the focal length of the observed thermal lens is from $-2$ m to $-10$ m.

In the third embodiment of the present invention, to reduce thermal lensing, the heat conductors 20 are bonded on the side surfaces 1b of the laser medium.

Figure 10:
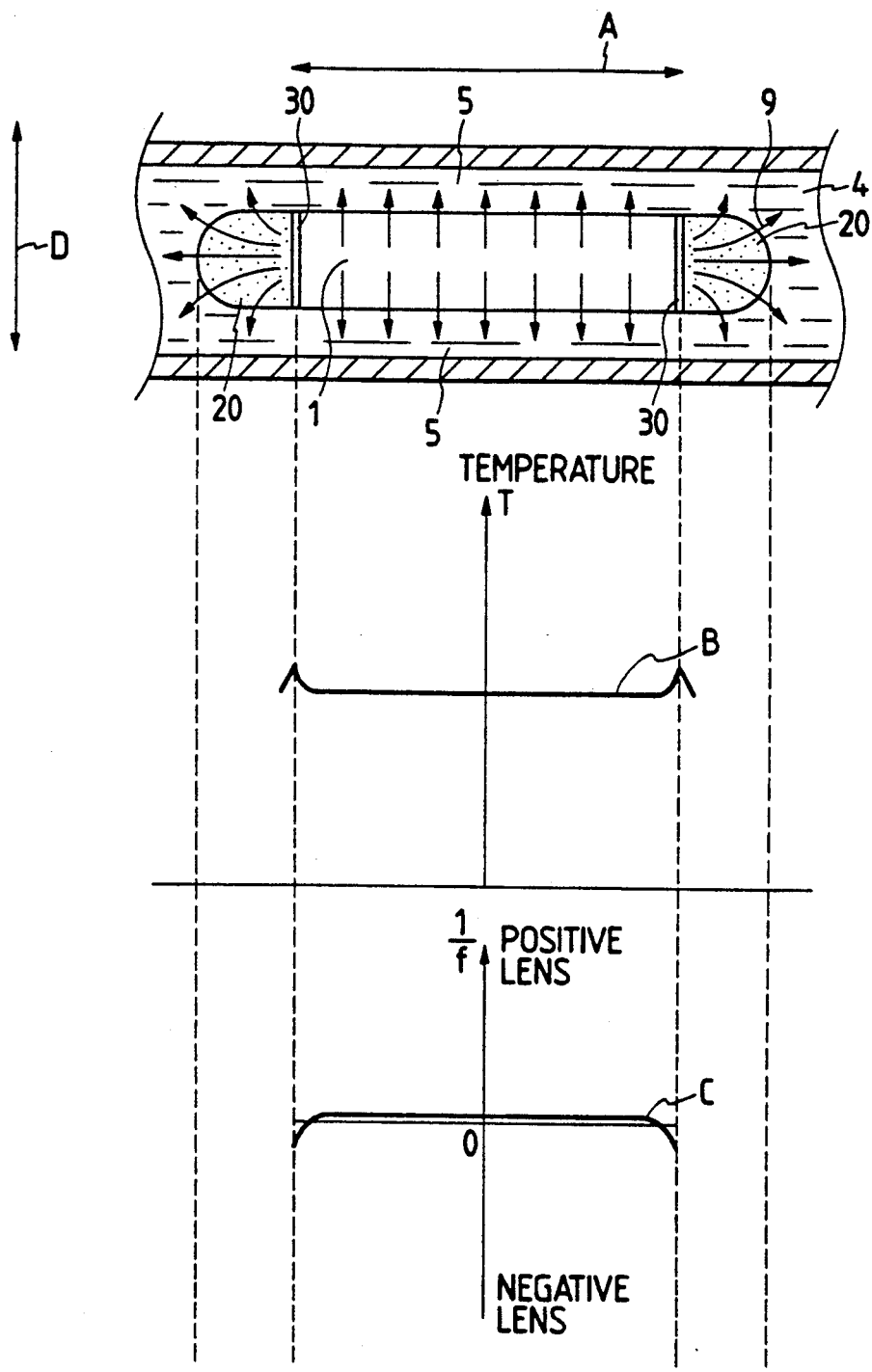

FIG. 10 shows the heat flow, the temperature distribution, and the thermal lens distribution in the laser medium in accordance with the third embodiment.

In this embodiment, as shown in FIG. 10, the heat which occurs in the bonding layer is removed by the heat conductors 20 and finally the heat is flown to the refrigerant 4 for the laser medium 1.

When a material with a particular thermal conductivity is used with respect to the thermal conductivity of the laser medium 1, on almost the entire region of the laser medium except in the vicinity of the side surface of the laser medium, the heat flow 9 takes place only in the thickness direction D. Thus, as shown by curve B of FIG. 10, the temperature distribution is uniform on the almost entire region of the laser medium in the width direction A. Thus, as shown by curve C of FIG. 10, the thermal lensing is reduced and the distribution becomes small.

When the thermal conductivity of the heat conductors 20 is extremely larger than that of the laser medium 1 or when the laser medium side surfaces 1b is cooled directly by the refrigerant 4, as shown in FIG. 11, the heat which occurs in the vicinity of the side surfaces of the laser medium is removed through the laser medium side surfaces. Thus, as shown by curve B of FIG. 11, the temperature in the vicinity of the laser medium side surfaces 1b become low. Consequently, the laser medium 1 has a positive lens distribution as shown by curve C of FIG. 11.

In our experiment, when a GGG crystal (thermal conductivity: $K=0.09$ W/cm deg) whose cross sectional area is 7 mm $\times$ 35 mm is used as the laser medium 1; aluminum (thermal conductivity: $K=2.4$ W/cm deg) is used as the heat conductors 20; Silpot 186 (thermal conductivity: $K=0.0015$ W/cm deg), which is a transparent silicone type bonding agent, is used as adhesive and the thickness of the bonding layer is in the range from 50 to 100 $\mu$m, a uniform temperature distribution for 30 mm of the laser medium 1 in the width direction A can be obtained. In addition, thermal lensing can be remarkably reduced and uniform. The focal length of the thermal lens is $+30$ m or more. When the electrical power level is varied from 0 to 12 kW, the distribution of the thermal lens does not change very much. Thus, we found that according to the present invention, the thermal lensing in the width direction A of the laser medium can be remarkably reduced.

Figure 12:
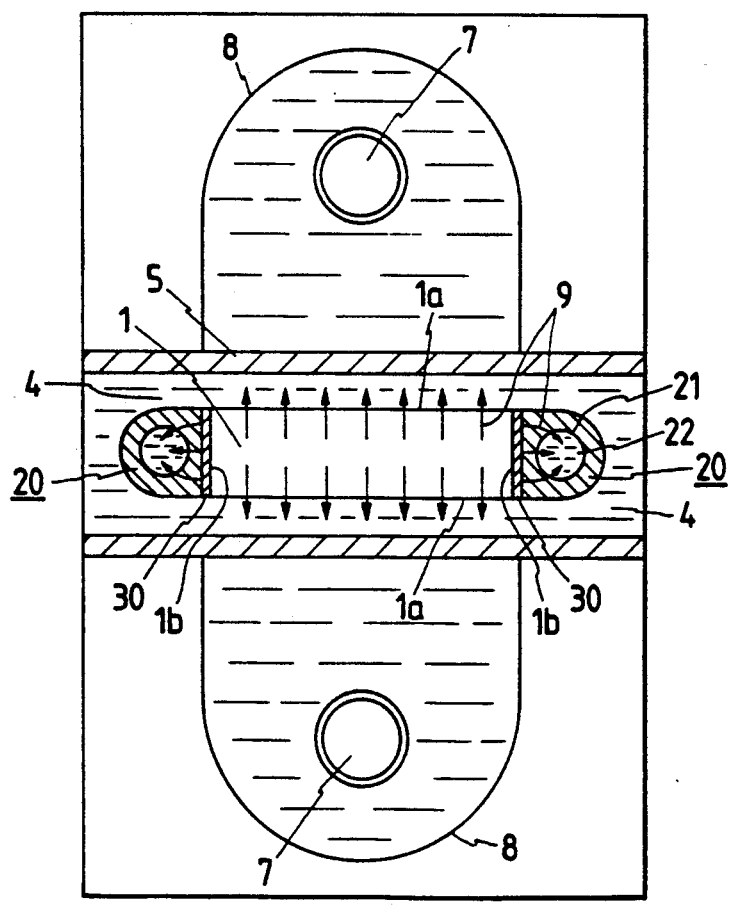
FIGS. 12 and 13 are a cross sectional view and a plan view showing a solid state laser apparatus according to a fourth embodiment of the present invention.
Figure 13:
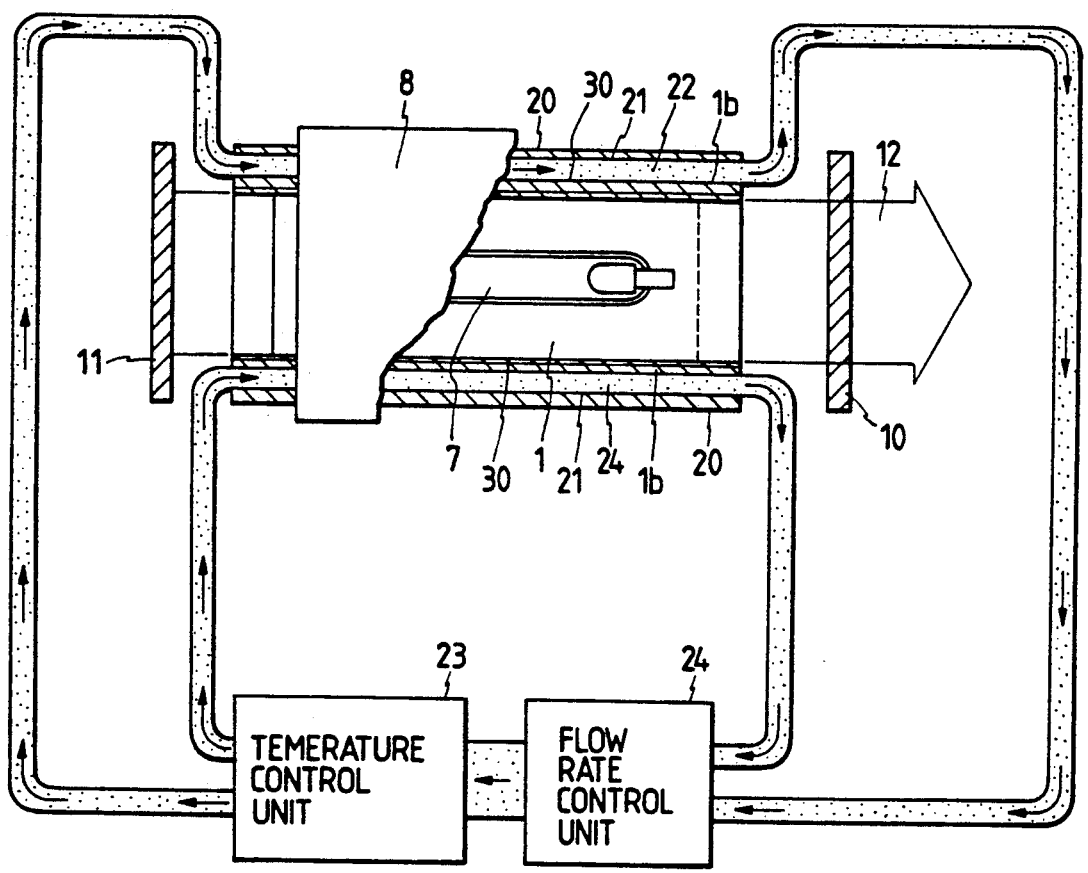

In the third embodiment, the heat removed from the bonding layers 30 by the heat conductors 20 was finally flown to the refrigerant 4 for the laser medium 1. However, as shown in FIG. 12, it is possible to provide the flow paths 21 in the heat conductors 20, and flow refrigerant 22 into the flow paths 21 so as to independently cool the heat conductor 20. In addition, as shown in FIG. 13, it is also possible to control the temperature and the flow rate of the refrigerant 22 in the flow path 21 by using a temperature control unit 23 and a flow rate control unit 24. Thus, the amount of heat removed from the laser medium side surfaces 1b can be controlled depending on the type and excitation condition of the laser medium 1 so that the thermal lens of the laser medium in the width direction can be reduced in a wide range of laser operation conditions.

As was described above, according to the above embodiments of the present invention, the heat conductors are disposed in contact with the laser medium, the means for cooling the laser medium and the heat conductors is provided, and the thermal conductivity of the heat conductors is determined so that the heat conductors remove the heat which occurs at the contact surfaces, and that in the laser medium, the amount of heat removed from the side surfaces is smaller than that from the optical flat surfaces. Thus, it is possible to provide a solid state laser apparatus with following advantages; the distortion of laser beam pattern is small, the wall plug efficiency of the laser oscillation is not decreased, and the beam quality is high. In addition, when the means for controlling the cooling performance of the heat conductors is provided, in accordance with various types of laser mediums and excitation conditions, the side surfaces of the laser medium can be cooled so that the thermal lensing of the laser medium in the width direction can be reduced and thereby the wall plug efficiency of the laser medium and beam quality can be improved.

What is claimed is:
1. A solid state laser apparatus, comprising:
a pumping light source for supplying a pumping light;

a solid state laser medium having a pair of optically flat surfaces confronting to each other for receiving said pumping light, and side surfaces intersecting said optically flat surfaces along an optical axis, said laser medium having a rectangular cross section;

a thermal insulator adhered to each of said side surfaces of said laser medium; and means, coupled to said thermal insulators, for shielding said thermal insulators from said pumping light.

2. A solid state laser apparatus, comprising:

a laser medium having a pair of optically flat surfaces confronting each other and side surfaces intersecting said optically flat surfaces along an optical axis, said laser medium having a rectangular cross section;

a supply of a refrigerant disposed around said laser medium; and heat conductors immersed in said refrigerant and bonded to said side surfaces of said laser medium, said heat conductors removing heat at bonding surfaces of said heat conductors with said laser medium, the amount of removed heat from said side surfaces being smaller than that from said optically flat surfaces;

said laser medium, said supply of refrigerant and said heat conductors being assembled in an integral unit.

3. The solid state laser apparatus as claimed in claim 2, wherein said cooling means further comprises means for controlling cooling performance of said heat conductors.

4. A solid state laser apparatus, comprising:

a pumping light source for supplying a pumping light;

a solid state laser medium having a pair of optically flat surfaces confronting to each other for receiving said pumping light, and side surfaces intersecting said optically flat surfaces along an optical axis, said laser medium having a rectangular cross section;

a thermal insulator adhered to each of said side surfaces of said laser medium; and means for shielding said thermal insulators from said pumping light, wherein said means for shielding said thermal insulators comprises a highly reflective coating film applied to each of said insulators.

5. A solid state laser apparatus, comprising:

a pumping light source for supplying a pumping light;

a solid state laser medium having a pair of optically flat surfaces confronting to each other for receiving said pumping light, and side surfaces intersecting said optically flat surfaces along an optical axis, said laser medium having a rectangular cross section;

a thermal insulator adhered to each of said side surfaces of said laser medium; and means for shielding said thermal insulators from said pumping light, wherein said means for shielding said thermal insulators comprises two light shielding plates, each of which is attached to a respective side of said thermal insulators and extends parallel to said optically flat surfaces.

6. A solid state laser apparatus as defined in claim 4, wherein said means for shielding said thermal insulators further comprises two light shielding plates, each of which is attached to a respective side of said thermal insulators and extends parallel to said optically flat surfaces.

* * * * *